(12) United States Patent
Forkosh et al.

(10) Patent No.: US 6,494,053 B1
(45) Date of Patent: Dec. 17, 2002

(54) DEHUMIDIFIER/AIR-CONDITIONING SYSTEM

(75) Inventors: Mordechai Forkosh, Haifa (IL); Dan Forkosh, Atlit (IL); Tomy Forkosh, Haifa (IL)

(73) Assignee: Drykor, Ltd., Atlit (IL)

( * ) Notice: Subject to any disclaimer, the term of this patent is extended or adjusted under 35 U.S.C. 154(b) by 0 days.

(21) Appl. No.: 09/936,671
(22) PCT Filed: Feb. 20, 2000
(86) PCT No.: PCT/IL00/00105
§ 371 (c)(1), (2), (4) Date: Sep. 14, 2001
(87) PCT Pub. No.: WO00/55546
PCT Pub. Date: Sep. 21, 2000

(30) Foreign Application Priority Data

Mar. 14, 1999 (IL) .................. PCT/IL99/00142

(51) Int. Cl.[7] ................ F25D 23/00; F25D 17/06
(52) U.S. Cl. ............................. 62/271; 62/94
(58) Field of Search ............... 62/271, 238.6, 62/89, 90, 92, 93, 94, 332

(56) References Cited

U.S. PATENT DOCUMENTS

| | | |
|---|---|---|
| 2,672,024 A | 3/1954 | McGrath |
| 2,798,570 A | 7/1957 | Kelley |
| 2,952,993 A | 9/1960 | Bosworth, Jr. |
| 4,180,985 A | 1/1980 | Northrup, Jr. |
| 4,259,849 A | 4/1981 | Griffiths |
| 4,373,347 A | 2/1983 | Howell et al. |
| 4,430,864 A | 2/1984 | Mathiprakasam |
| 4,474,021 A * | 10/1984 | Harband ............... 62/94 |
| 4,635,446 A | 1/1987 | Meckler |
| 4,685,617 A | 8/1987 | Assaf |
| 4,691,530 A | 9/1987 | Meckler |
| 4,700,550 A | 10/1987 | Rhodes |
| 4,723,417 A | 2/1988 | Meckler |

(List continued on next page.)

FOREIGN PATENT DOCUMENTS

| | | |
|---|---|---|
| EP | 0 217 656 | 4/1987 |
| EP | 0 397 458 | 11/1990 |
| WO | WO 96/33378 | 10/1996 |
| WO | WO 98/29694 | 7/1998 |
| WO | WO 99/22180 | 5/1999 |
| WO | WO 99/26025 | 5/1999 |
| WO | WO-99/26026 A1 * | 5/1999 |

OTHER PUBLICATIONS

Rüdiger, P.; "Trockene Luft mit Kathabar–Anlagen;" 1988; pp. 18–21; Die Kälte Und Klimatechnik; No. 1; XP002139536.

*Primary Examiner*—Chen-Wen Jiang
(74) *Attorney, Agent, or Firm*—Fenster & Company Patent Attorneys Ltd.

(57) ABSTRACT

An air conditioning and dehumidifier system (310) comprising: an air conditioner (312) comprising a cooling unit, a first inlet (316) to the cooling unit drawing air from a controlled area (314); a second inlet (338) to the cooling unit drawing fresh air firm outside the area (314); an outlet (324) to the area (314); a condenser (328) with an air inlet (330) into which relatively cool outside air is drawn; and a heated air outlet (334) from the condenser (328); a dehumidifying unit (342) utilizing liquid desiccant, comprising a drying unit (344) having a wet air inlet (346) and dry air outlet (348); a regenerator unit (350); a hot air inlet (352); a wet air outlet (354); and a heat pump that transfers heat from relatively cooler liquid desiccant to relatively warmer liquid desiccant; a conduit connecting the heated air outlet (334) of the air conditioner (312) to the hot air inlet (352) of the dehumidifying unit (342); and a conduit (349) connecting the dry air outlet (348) of the dehumidifying unit (342) to the second inlet (338) of the air conditioner (312).

16 Claims, 6 Drawing Sheets

U.S. PATENT DOCUMENTS

| | | | |
|---|---|---|---|
| 4,819,444 A | | 4/1989 | Meckler et al. |
| 4,887,438 A | * | 12/1989 | Meckler .................. 62/271 |
| 4,905,479 A | * | 3/1990 | Wilkinson ............... 62/271 |
| 4,910,971 A | | 3/1990 | McNab |
| 4,939,906 A | | 7/1990 | Spatz et al. |
| 4,941,324 A | | 7/1990 | Peterson et al. |
| 4,955,205 A | | 9/1990 | Wilkinson |
| 4,984,434 A | * | 1/1991 | Peterson et al. ............ 62/94 |
| 4,987,750 A | | 1/1991 | Meckler |
| 5,020,334 A | | 6/1991 | Wilkinson |
| 5,022,241 A | | 6/1991 | Wilkinson |
| 5,058,394 A | | 10/1991 | Wilkinson |
| 5,070,703 A | | 12/1991 | Wilkinson |
| 5,191,771 A | | 3/1993 | Meckler |
| 5,197,299 A | | 3/1993 | Sohn et al. |
| 5,213,154 A | | 5/1993 | Marsala et al. |
| 5,233,843 A | | 8/1993 | Clarke |
| 5,297,398 A | | 3/1994 | Meckler |
| 5,351,497 A | | 10/1994 | Lowenstein |
| 5,471,852 A | | 12/1995 | Meckler et al. |
| 5,582,025 A | | 12/1996 | Dubin et al. |
| 5,661,983 A | * | 9/1997 | Groten et al. ............... 62/271 |
| 5,791,153 A | * | 8/1998 | Belding et al. .............. 62/93 |
| 5,816,065 A | * | 10/1998 | Maeda ..................... 62/271 |
| 5,826,641 A | | 10/1998 | Bierwirth et al. |
| 5,950,442 A | * | 9/1999 | Maeda et al. ............ 62/332 X |
| 6,018,954 A | | 2/2000 | Assaf |
| 6,134,903 A | | 10/2000 | Potnis et al. |
| 6,138,470 A | | 10/2000 | Potnis et al. |

* cited by examiner

DEHUMIDIFIER/AIR-CONDITIONING SYSTEM

RELATED APPLICATIONS

The present application is a U.S. national application of PCT/IL00/00105, filed Feb. 20, 2000.

FIELD OF THE INVENTION

The present invention is related to the field of environmental control systems and more particularly, to the field of systems which combine dehumidification and air conditioning.

BACKGROUND OF THE INVENTION

In general, air conditioning systems not only reduce the temperature of the ambient air, but also remove substantial amounts of water from it. This is especially true when the air conditioner is treating "fresh" air inputted from outside the controlled environment. However, such combined air conditioning/dehumidification is generally inefficient. Furthermore, since some of the potential cooling power of the air-conditioner is used for dehumidification, the effective cooling capacity of the air conditioner is significantly reduced.

It is known in the art to provide dehumidification of air prior to its being cooled. In some cases, the mechanisms of the dehumidifier and the air conditioner are not integrated. In such cases, while there is an increase in the cooling capacity of the air conditioner, the overall efficiency of the system is relatively poor.

U.S. Pat. No. 4,984,434 describes an integrated system in which air to be cooled is first dehumidified by passing it through a desiccant type dehumidifier before being cooled by contact with an evaporator of an air conditioner. Regeneration of the desiccant is performed by passing the water containing desiccant over the condenser of the air conditioning system.

This system suffers from a number of limitations. Firstly, it dehumidifies all of the air being cooled. Since most of the air inputted to the dehumidifier is from the controlled space (and thus fairly dry already) the dehumidifier does not remove much water from the air and thus does not provide much cooling for the condenser. This would cause an overall increase in the temperature of the desiccant and a reduction in the efficiency of both the dehumidifier and the air-conditioner. A second problem is that such a system is not modular, namely, the dehumidifier must be supplied as part of the system. Furthermore, adding a dehumidifier to an existing air conditioning system and integrating the dehumidifier and air conditioner to form the system of this patent appears to be impossible.

Another type of dehumidifying/air conditioning system is also known. In this type of system, as described, for example in U.S. Pat. Nos. 5,826,641, 4,180,985 and 5,791,153, a dry desiccant is placed in the air input of the air-conditioner to dry the input air before it is cooled. Waste heat (in the form of the exhaust air from the condenser) from the air conditioner is then brought into contact with the desiccant that has absorbed moisture from the input air in order to dry the desiccant. However, due to the relatively low temperature of the air exiting the air conditioner, the amount of drying available from the desiccant is relatively low.

The above referenced U.S. Pat. No. 4,180,985 also describes a system using liquid desiccant as the drying medium for the dehumidifying system. Here again, the low temperature of the exhaust as from the air conditioner reduces substantially the efficiency of the system.

Prior art desiccant based dehumidifiers generally require the movement of the desiccant from a first region in which it absorbs moisture to a second regeneration region. In the case of solid desiccants, this transfer is achieved by physically moving the desiccant from a dehumidifying station to a regeneration station, for example by mounting the desiccant on a rotating wheel, a belt or the like. In liquid desiccant systems two pumps are generally provided, one for pumping the liquid to the regeneration station and the other for pumping the liquid from the regeneration station to the dehumidifying station. In some embodiments, a single pump is used to pump from one station to the other, with the return flow being gravity fed.

The operation of standard air conditioning systems and the desiccant systems described above is illustrated with the aid of FIG. 1. FIG. 1 shows a chart of temperature vs. absolute humidity in which iso-enthalpy and iso-relative humidity curves are superimposed. Normal air conditioners operate on the principle of cooling the input air by passing it over cooling coils. Assuming that the starting air conditions are at the spot marked with an X, the air is first cooled (curve 1) until its relative humidity is 100% at which point further cooling is associated with condensation of moisture in the air. In order for there to be removal of liquid from the air, it must be cooled to a temperature that is well below a comfort zone 4. The air is heated to bring it to the comfort zone, generally by mixing it with warmer air already in the space being cooled. This excess cooling in order to achieve dehumidification is a major cause of low efficiency in such systems, under certain conditions.

Normal dehumidifier systems actually heat the air while they remove air from it. During dehumidification (curve 2) the enthalpy hardly changes, since there is no removal of heat from the system of air/desiccant. This results in an increase in temperature of both the desiccant and the air being dried. This extra heat must then be removed by the air conditioning system, lowering its efficiency.

In all dehumidifier systems mechanical power must be exerted to transfer the desiccant in at least one direction between a regenerating section and a dehumidifying section thereof. For liquid systems, pumps are provided to pump liquid in both directions between the two sections or between reservoirs in the two sections. While such pumping appears to be necessary in order to transfer moisture and/or desiccant ions between the two sections, the transfer is accompanied by undesirable heat transfer as well.

SUMMARY OF THE INVENTION

An aspect of some preferred embodiments of the invention is concerned with a combined dehumidifier/air conditioner is which a relatively low level of integration is provided. In preferred embodiments of the invention, heat generated by the condenser is used to remove liquid from the desiccant. However, unlike the above referenced prior art, the air conditioner condenser continues to be cooled by outside air. The heated air which exits the air-conditioner, containing waste heat, is used to remove moisture from the desiccant.

In contrast to the prior art, in which the heated air is the sole source of energy for the regeneration of the desiccant, in preferred embodiments of the invention, a heat pump is utilized to transfer energy from relatively cool desiccant to heat the desiccant during regeneration, in addition to the heat supplied from the exhaust of the air conditioning portion of the system. This results in a system in which the air conditioner does not have to overcool the air to remove moisture and the dehumidifier does not heat the air in order to remove moisture. This is in contrast with the prior art systems in which one or the other of these inefficient steps must be performed.

In some preferred embodiments of the invention combined dehumidifier/air-conditioner in which only "fresh", untreated air is subject to dehumidification prior to cooling by the air conditioner. This allows for both the dehumidifier and the air-conditioner to operate at high efficiency, since the dehumidifier will be operating on only wet "fresh" air and the air conditioner will be cooling only relatively dry air.

Thus, in preferred embodiments of the invention, the amount of waste heat generated by the air-conditioner is relatively high and the heat requirements of the dehumidifier are relatively low, since a major portion of the heat for regeneration is supplied by the heat pump.

According to an aspect of the invention a simple method of integration of an air conditioner and dehumidifier is provided. In accordance with a preferred embodiment of the invention, the air conditioner and dehumidifier are separate units without conduits for air connecting the units. However, unlike prior art unintegrated units, the present invention provides advantages of utilizing waste heat from the air conditioner to provide regeneration energy for the dehumidifier.

According to an aspect of some preferred embodiments of the invention, in the steady state, moisture is transferred from the dehumidifier portion of a system to the regenerator without the necessity of transferring liquid from the regenerator back to the dehumidifier.

In general, in liquid dehumidifier systems, moisture must be transferred from the dehumidifier section to the regenerator section. Since the moisture is in the form of a moisture rich (low concentration) desiccant, this is performed by pumping or otherwise transferring the desiccant. Since the desiccant also contains desiccant ions, these must be returned to the dehumidifier to maintain the desiccant ion level required for dehumidification. This is generally achieved by pumping high concentration desiccant from the regenerator to the dehumidifier section. However, in addition to pumping ions, moisture is also transferred. While the extra energy utilized for pumping may or may not be significant, the inadvertent heat transfer implicit in pumping of the moisture back to the dehumidifier is significant in reducing the efficiency of the system.

In a preferred embodiment of the invention, reservoirs in the dehumidifier and regenerator sections are connected with a passageway that allows only limited flow. Preferably, the passageway takes the form of an aperture in a wall common to the two reservoirs.

During operation, the absorption of moisture in the dehumidifying section increases the volume in the dehumidifier reservoir, resulting in the flow, by gravity, of moisture rich (low concentration) desiccant from the dehumidifier reservoir to the regenerator reservoir. This flow also carries with it a flow of desiccant ions, which must be returned to the dehumidifier section. As indicated above, in the prior art, this is achieved by pumping ion rich desiccant solution from the regenerator to the dehumidifier section. In a preferred embodiment of the invention, the return flow of ions is achieved, by diffusion of ions, via the aperture, from the high concentration regenerator reservoir to the low concentration reservoir. The inventors have found that, surprisingly, diffusion is sufficient to maintain a required concentration of ions in the dehumidifier section and that the return flow is not associated with an undesirable heat transfer associated with the transfer of (hot) moisture together with the ions, as in the prior art.

In especially preferred embodiments of the invention, no pumps are used to transfer desiccant between the reservoirs or between the dehumidifier section and the regenerator, in either direction.

There is thus provided, in accordance with a preferred embodiment of the invention, an air conditioning and dehumidifier system for controlling the environment of a controlled area, comprising:

an air conditioner comprising:
        a cooling unit in which air is cooled;
        a first inlet to the cooling unit drawing air from the area;
        a second inlet to the cooling unit drawing fresh air from outside the area;
        an outlet to the area via which cooled air is transferred to the area;
        a heat exchanger at which heat removed from air by the cooling unit is removed from the air conditioner;
        an air inlet to the heat exchanger into which relatively cool outside air is drawn, heat being transferred to said air from said heat exchanger; and
        a heated air outlet from the heat exchanger from which the heated air exits;
    a dehumidifying unit utilizing liquid desiccant, comprising:
        a drying unit having a wet air inlet and a dry air outlet from which air dried by the drying unit exits and in which liquid desiccant dries the air and removes heat from it;
        a regenerator unit in which moisture removed from air by the drying unit is removed from the liquid desiccant;
        a hot air inlet to the regenerator unit;
        a wet air outlet from the regenerator unit via which air entering the hot air inlet exits after moisture is transferred to it; and
    a heat pump that transfers heat from relatively cooler liquid desiccant in the dehumidifying unit to relatively warmer liquid desiccant;
    a conduit connecting the heated air outlet of the air conditioner to the hot air inlet of the dehumidifying; and
    a conduit connecting the dry air outlet of the dehumidifying unit to the second inlet of the air conditioner.

Preferably, moisture removal from the desiccant is aided by providing heat to the regenerator.

In a preferred embodiment of the invention, the system includes at least one pump to pump desiccant between the driving unit and the regenerator.

Preferably, the relatively cooler liquid desiccant is in a dehumidifier sump that receives desiccant after it has absorbed moisture from the outside air.

Preferably, the drying unit comprises a chamber in which said moisture is removed from the outside air and wherein the heat is removed by the heat pump from liquid desiccant being transported to the chamber. Preferably, the drying unit comprises a dehumidifier sump that receives desiccant after it has absorbed moisture from the outside air and wherein the heat is removed by the heat pump from liquid desiccant being transported to the chamber from the sump.

In a preferred embodiment of the invention, the regenerator unit comprises a compartment that contains liquid desiccant being regenerated and wherein the heat is transferred directly by the heat pump to said desiccant in said compartment.

Preferably, the regenerator unit comprises a compartment that contains liquid desiccant being regenerated and wherein the heat is transferred by the at least one heat pump to liquid desiccant being transported to the compartment. Preferably, the regenerator unit comprises a regenerator sump that receives desiccant after moisture has been removed from it and wherein the heat is transferred to desiccant being transported to the chamber from the regenerator sump.

In a preferred embodiment of the invention, the air conditioner includes a fan to draw air into the cooling unit and wherein the fan is also operative to draw air into the wet air inlet of the drying unit.

In a preferred embodiment of the invention, the air conditioner includes a fan to draw air into the heat exchanger and wherein the fan is also operative to force air exiting the heat exchanger into the hot air inlet of the regenerator.

In a preferred embodiment of the invention, the air conditioner utilizes a refrigerant to which heat is transferred in a condenser in said cooling unit and from which refrigerant heat is transferred in an evaporator in said heat exchanger.

In a preferred embodiment of the invention, the air conditioner cools an interior space and wherein the heat exchanger is outside the space.

Preferably, the wet air inlet communicates to an area outside the controlled area.

In a preferred embodiment of the invention, the controlled area is at least a portion of a building.

In a preferred embodiment of the invention, the proportion of air drawn into the cooling unit via the first and second inlets thereto is at least partially controllable.

There is further provided, in accordance with a preferred embodiment of the invention, a dehumidifier system comprising:
  a liquid desiccant in two reservoirs, one of which contains a higher desiccant concentration than the other;
  a dehumidifier unit into which moist air is introduced and from which less moist air is removed after dehumidification by liquid desiccant transferred thereto;
  a regenerator unit which receives desiccant solution that has absorbed from the moist air and removes moisture from it; and
  a passageway connecting the reservoirs, via which passageway, during steady state operation of the dehumidifier, there is a net flow of moisture from the reservoir having the lower desiccant concentration to the other reservoir without there being a net flow of desiccant ions through the passageway.

Preferably, the passageway is an aperture such that the level of liquid desiccant in the two reservoirs is the same.

In a preferred embodiment of the invention, there is no pumping of liquid desiccant from one reservoir to the other. Preferably, the transfer of moisture is by gravity.

In a preferred embodiment of the invention, there is no transfer of liquid desiccant between the reservoirs except via apertures connecting the reservoirs.

In a preferred embodiment of the invention, the two reservoirs include a first reservoir which receives said liquid desiccant from said dehumidifying chamber after said desiccant absorbs moisture thereat. Preferably, liquid desiccant is transferred to the dehumidifying chamber from the first reservoir.

In a preferred embodiment of the invention, the two reservoirs include a second reservoir which receives said liquid desiccant from said regenerator after removal of moisture therefrom. Preferably, liquid desiccant is transferred to the regenerating chamber from said second reservoir.

In a preferred embodiment of the invention, the dehumidifier includes a heat pump that transfers heat from relatively cooler liquid desiccant to relatively warmer liquid desiccant. Preferably, the heat pump pumps heat from the reservoir having the lower concentration of desiccant to that having the higher concentration of desiccant. In a preferred embodiment of the invention, the heat pump transfers heat from desiccant in a conduit carrying desiccant to the dehumidifier unit.

In a preferred embodiment of the invention, a substantial temperature differential is maintained between the first and second reservoirs. Preferably, the temperature differential is at least 5° C. In some preferred embodiments of the invention, the temperature differential is at least 10° C. or at least 15° C.

BRIEF DESCRIPTION OF THE DRAWINGS

Particular embodiments of the invention will be described with reference to the following description of preferred embodiments in conjunction with the figures, wherein identical structures, elements or parts which appear in more than one figure are preferably labeled with a same or similar number in all the figures in which they appear, in which.

DETAILED DESCRIPTION OF PREFERRED EMBODIMENTS OF THE INVENTION

In some preferred embodiments of the invention, the dehumidifiers described in applicants' PCT Applications PCT/IL97/00372, filed Nov. 16, 1997 and PCT/IL98/00552, filed Nov. 11, 1998, the disclosures of which are incorporated herein by reference, are used as dehumidifier 42. These applications were published on May 27, 1999 as WO 99/26025 and WO 99/26026 respectively. They were published after the filing of the application from which the present application claims priority and were incorporated by reference therein. In view of the utility of these dehumidifiers in the present invention, the dehumidifiers described therein are described in detail herein.

Figure 2:
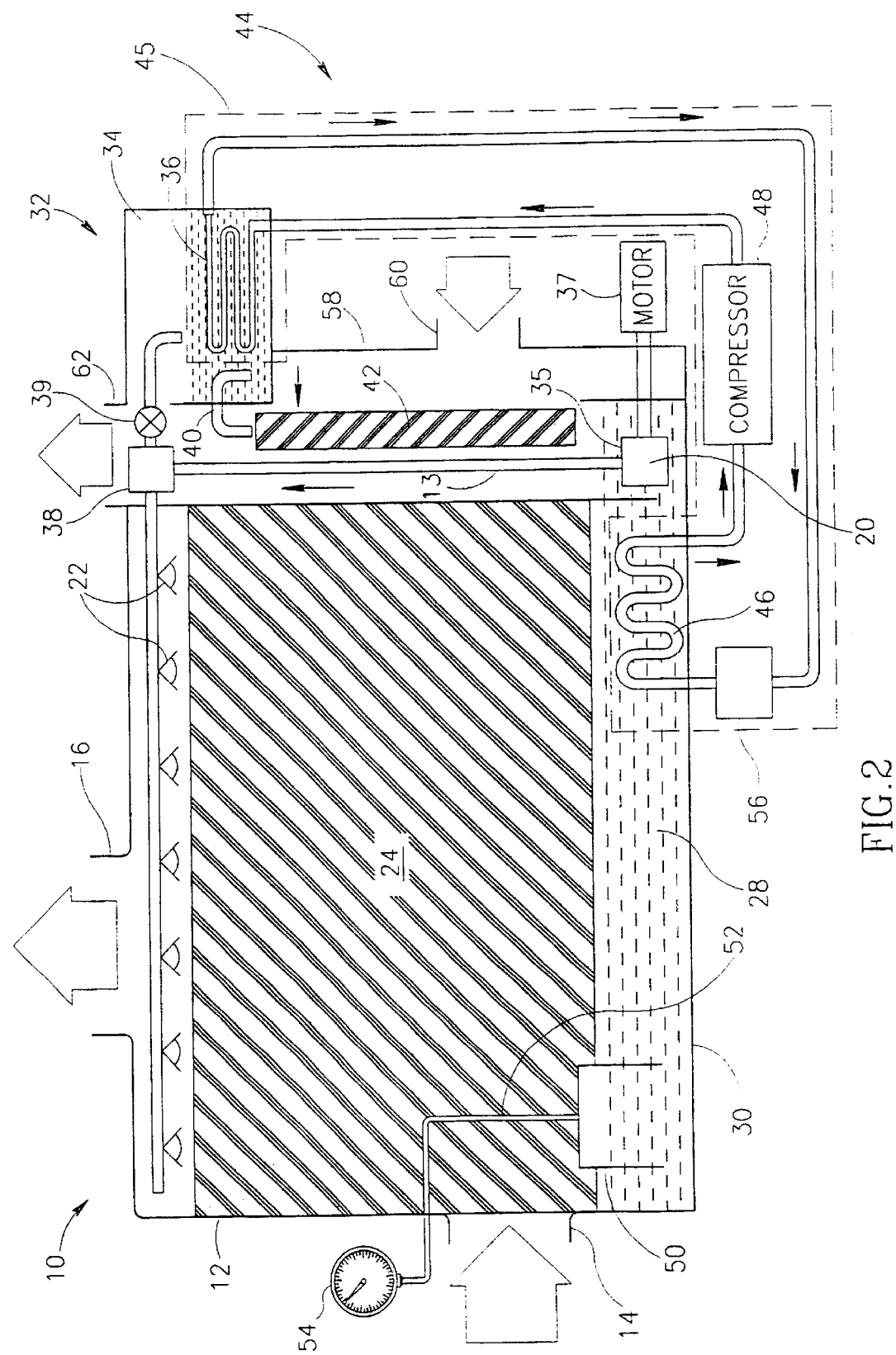
FIG. 2 schematically shows a dehumidifier unit, usable in a combined dehumidifying/air-conditioning system, in accordance with a preferred embodiment of the invention.

Referring first to FIG. 2, a dehumidifying system 10, as described in the above referenced applications, comprises, as its two main sections a dehumidifying chamber 12 and a regenerator unit 32. Moist air enters dehumidifying chamber 12 via a moist air inlet 14 and dried air exits chamber 12 via a dry air outlet 16.

Preferably, desiccant 28 is pumped by a pump 20 from a desiccant reservoir 30 via a pipe 13 to a series of nozzles 22. These nozzles shower a fine spray of the desiccant into the interior of chamber 12, which is preferably filled with a cellulose sponge material 24 such as is generally used in the art for such purposes. More preferably, the desiccant is simply dripped on the sponge material. The desiccant slowly percolates downward through the sponge material into reservoir 30. Moist air entering the chamber via inlet 14 contacts the desiccant droplets. Since the desiccant is hydroscopic, it absorbs water vapor from the moist air and drier air is expelled through outlet 16. Preferably, reservoir 30 is located on the bottom of chamber 12 so that the desiccant from sponge 24 falls directly into the reservoir.

In this embodiment, a pump 35 and associated motor 37 pump desiccant from an extension of reservoir 30 into pipe 13. A divider 38 receives desiccant from pipe 13 and sends part of the desiccant to nozzles 22 and part to regenerator unit 32. A valve or constriction 39 (preferably a controllable valve or constriction) may be provided to control the proportion of the desiccant which is fed to regenerator 32. If a controllable valve or constriction is used, the amount of desiccant is preferably controlled in response to the amount of moisture in the desiccant.

Chamber 34 includes a heat exchanger 36 which heats the desiccant to drive off part of the water vapor it has absorbed, thus regenerating it.

Regenerated liquid desiccant is transferred back to reservoir 30 via a pipe 40 and a tube 42 of sponge material such as that which fills chamber 12. Tube 40 is preferably contained in a chamber 58 which has an inlet 60 and an outlet 62. Air, generally from outside the area in which the air is being modified, for example from an air conditioning exhaust, as described below, enters the chamber via inlet 60 and carries away additional moisture which is evaporated from the still hot desiccant in tube 42. The air exiting at outlet 62 carries away this moisture and also moisture which was removed from the desiccant in the regenerator. Preferably a fan (not shown) at exit 62 sucks air from chamber 58.

Alternatively or additionally, heat is transferred from the regenerated liquid desiccant to the desiccant entering or in the regenerator by bringing the two desiccant streams into thermal (but not physical) contact in a thermal transfer station (not shown). Alternatively or additionally, a heat pump may be used to transfer additional energy from the cooler desiccant leaving the regenerator to the honer desiccant entering the regenerator, such that the desiccant returning to the reservoir is actually cooler than the desiccant which enters chamber 58.

Preferably, a heat pump system 44 is provided which extracts heat from the desiccant in reservoir 30 to provide energy to heat exchanger 36. Preferably, this heat pump includes (in addition to exchanger 36 which is the condenser of the system) a second heat exchanger 46 in reservoir 30, which is the evaporator of the system, and an expansion valve 56. This transfer of energy results in a reduced temperature of the desiccant which contacts the air being dried thus reducing the temperature of the dried air. Second, this transfer of energy reduces the overall requirement of energy for operating the regenerator, generally by up to a factor of 3. Since the energy utilized by the regeneration process is the major energy requirement for the system, this reduction in energy usage can have a major effect on the overall efficiency of the system. Additionally, this method of heating of the desiccant in the regenerator may be supplemented by direct heating, utilizing a heating coil or waste heat from an associated air-conditioner.

It should be understood that the proportion of water vapor in the desiccant in reservoir 30 and in the regenerated desiccant must generally be within certain limits, which limits depend on the particular desiccant used. A lower limit on the required moisture level is that needed to dissolve the desiccant such that the desiccant is in solution and does not crystallize. However, when the moisture level is too high, the desiccant becomes inefficient in removing moisture from the air which enters chamber 12. Thus, it is preferable that the moisture level be monitored and controlled. It should be noted that some desiccants are liquid even in the absence of absorbed moisture. The moisture level in these desiccants need not be so closely controlled. However, even in these cases the regeneration process (which uses energy) should only be performed when the moisture level in the desiccant is above some level.

This monitoring function is generally performed by measurement of the volume of desiccant, which increases with increasing moisture. A preferred method of measuring the volume of liquid in the reservoir is by measurement of the pressure in an inverted vessel 50 which has its opening placed in the liquid in the reservoir. A tube 52 leads from vessel 50 to a pressure gauge 54. As the volume of desiccant increases from the absorption of moisture, the pressure measured by gauge 52 increases. Since the volume of desiccant in the dehumidifier chamber and in the regenerator is fairly constant, this gives a good indication of the amount of desiccant and thus of the amount of moisture entrained in the desiccant. When the moisture level increases above a preset value, the heat in chamber 34 is turned on. In a preferred embodiment of the invention, when the moisture level falls below some other, lower preset value, the heater is turned off.

Other factors which may influence the cut-in and cut-out points of the regeneration process are the temperature of the dry air, the regeneration efficiency and the heat pump efficiency. In some preferred embodiments of the invention, it may be advisable to provide some direct heating of desiccant in the regeneration process.

In other embodiments, heat pumps or other heat transfer means (not shown for simplicity) are provided to transfer heat from the dried air exiting chamber 12 and or from the heated moist air leaving regenerator chamber 34, to heat the desiccant on its way to or in chamber 34. If heat pumps are used, the source of the heat may be at a temperature lower than the desiccant to which it is transferred.

It should be understood that cooling of the desiccant in the reservoir can result in dried air leaving the dehumidifier which has the same, or preferably a lower temperature than the moist air entering the dehumidifier, even prior to any additional optional cooling of the dry air. This feature is especially useful where the dehumidifier is used in hot climates in which the ambient temperature is already high.

As indicated above, one of the problems with dehumidifier systems is the problem of determining the amount of water in the desiccant solution so that the dehumidifier solution water content may be kept in a proper range.

Figure 3:
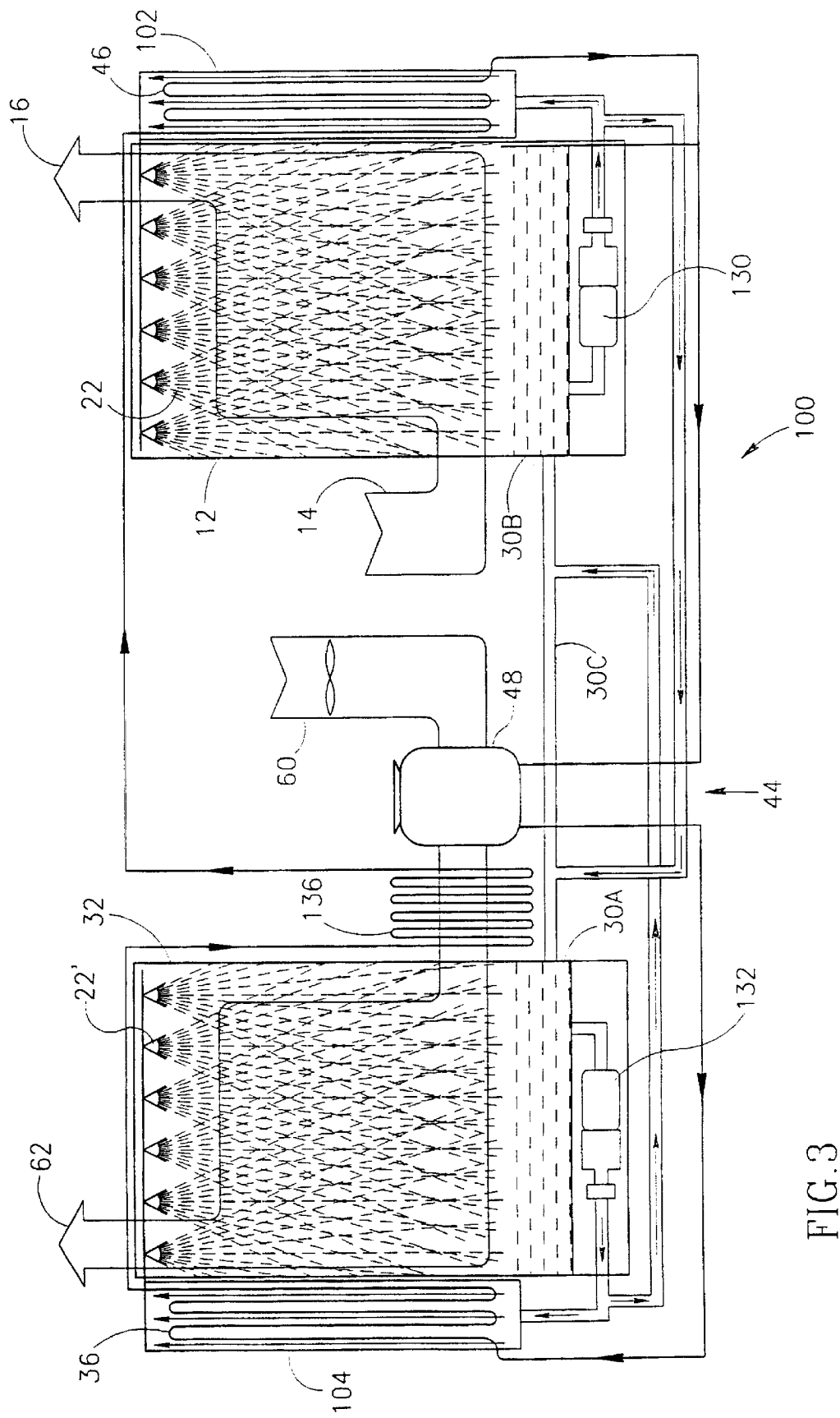
FIG. 3 schematically shows a second dehumidifier unit, usable in a combined dehumidifying/air conditioning system, in accordance with an alternative preferred embodiment of the invention.

A self regulating dehumidifier 100, that is self regulating with respect to water content of the desiccant solution and thus does not require any measurement of the volume or water content of the desiccant solution, is shown in FIG. 3. Furthermore, the dehumidifier operates until a predetermined humidity is reached and then ceases to reduce the humidity, without any controls or cut-offs.

Figure 1:
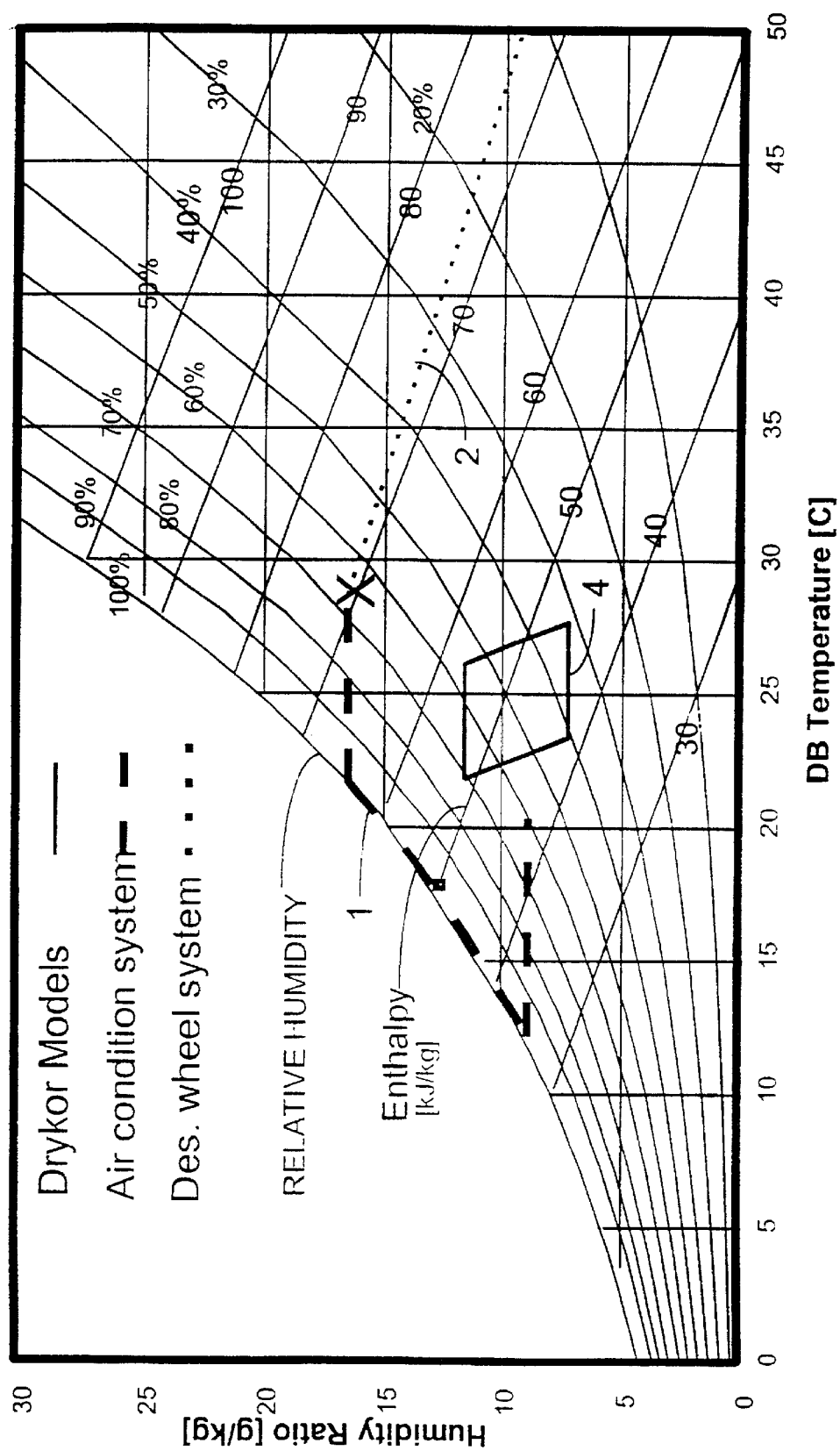
FIG. 1 shows cooling and dehumidification curves for conventional air conditioning and dehumidification systems.

Dehumidifier 100 is similar to dehumidifier 10 of FIG. 1, with several significant differences. First, the system does not require any measurement of water content and thus does not have a volumetric measure for the desiccant. However, such a measurement may be provided as a safety measure if the solution becomes too concentrated.

Second, the heat pump transfers heat between two streams of desiccant solution being transferred from reservoir 30 (which is conveniently divided into two portions 30A and 30B connected by pipes 30C), namely a first stream being pumped to nozzles 22 by a pump system 130, via a conduit 102 and a second stream being pumped to regenerator unit 32 by a pump system 132, via a conduit 104.

Preferably, pipes 30C (including the bypass pipes shown) are designed so that its major effect is to generate a common level of the solution in portions 30A and 30B. In general, it is desirable that the two reservoir portions have different temperatures. This necessarily results in different concentrations of desiccant. However, it is considered generally desirable to provide some mixing between the sections, by some pumping via the bypass pipes shown so as to transfer moisture from one portion to the other. In a preferred embodiment of the invention a temperature differential of 5° C. or more is maintained, more preferably, 10° C. or more and most preferably 15° C. or even more. Thus, in a preferred embodiment of the invention, reservoir portion 30A is at a temperature of 30° C. or more and reservoir portion 30B is at a temperature of 15° C. or less.

In FIG. 3, a different construction for regenerator unit 32 is shown, which is similar to that of the dehumidifier section. Furthermore, in FIG. 3, neither section has a cellulose sponge material. Such material may be added to the embodiment of FIG. 3 or it may be omitted from the embodiment of FIG. 2 and replaced by the spray mechanism of FIG. 3.

In a preferred embodiment of the invention, applicable to either FIGS. 2 or 3, spray nozzles are not used. Rather, the spray nozzles are replaced by a dripper system from which liquid is dripped on the cellulose sponge to continuously wet the sponge. Such systems are shown, for example in the above referenced PCT/TL98/00552.

Returning to FIG. 3, heat pump system 44 extracts heat from the desiccant solution in conduit 102 and transfers it to the desiccant in conduit 104. Heat pump system 44 preferably contains, in addition to the components contained in the embodiment of FIG. 2, an optional heat exchanger 136 to transfer some of the heat from the refrigerant leaving heat exchanger 104 to the regenerating air. Preferably, the compressor is also cooled by the regenerating air. However, when the air is very hot, additional air, not used in the regenerator, may be used for cooling the compressor and the refrigerant. Alternatively, only such air is used for such cooling.

The resultant heating of the air entering the regenerator increases the ability of the air to remove moisture from the desiccant. Heat pump 44 is set to transfer a fixed amount of heat. In a preferred embodiment of the invention, the humidity set point is determined by controlling the amount of heat transferred between the two streams.

Consider the system shown in FIG. 3, with the air entering dehumidifier chamber 12 at 30 degrees C. and 100% humidity. Assume further that the amount of liquid removed from the air reduces its humidity to 35% without reducing the temperature. In this situation, the amount of heat transferred between the streams of desiccant solution would be equal to the heat of vaporization of the water removed from the air, so that the temperature of the desiccant solution falling into reservoir 20 from chamber 12 is at the same temperature as that which enters it, except that it has absorbed a certain amount of moisture from the air.

Assume further, that the regenerator is set up, such that at this same temperature and humidity, it removes the same amount of water from the desiccant solution. This may require an input of heat (additionally to the heat available from the heat pump).

Further assume that the air entering the dehumidifier chamber has a lower humidity, for example 80%. For this humidity, less liquid is removed (since the efficiency of water removal depends on the humidity) and thus, the temperature of the desiccant solution leaving the dehumidifier chamber also drops. However, since less water enters the desiccant solution from the dehumidifier chamber, the amount of water removed from the solution in the regenerator also drops. This results in a new balance with less water removed and the desiccant solution at a lower temperature. A lower temperature desiccant results in cooler air. Thus, the temperature of the exiting air is also reduced. However, the relative humidity remains substantially the same. It should be understood that a reduction of input air temperature has substantially the same effect.

Generally, the system is self regulating, with the dehumidifying action cutting off at some humidity level. The humidity level at which this takes place will depend on the capacity of the solution sprayed from nozzles 22 to absorb moisture and the ability of the solution and on the capacity of the solution sprayed from nozzles 22' to release moisture.

In general as the air at inlet 14 becomes less humid (relative humidity) the dehumidifier becomes less able to remove moisture from it. Thus, the solution is cooled on each transit through the conduit 102 and the percentage of desiccant in the solution in 30B reaches some level. Similarly, as less moisture is removed from the air, the solution in 30A becomes more concentrated and less moisture is removed from it (all that happens is that it gets heated. At some point, both removal and absorption of moisture by the solution stop since the respective solutions entering the dehumidifier and regenerator chambers are in stability with the air to which or from which moisture is normally transferred.

It should be understood that this humidity point can be adjusted by changing the amount of heat transferred between the solutions in conduits 102 and 104. If greater heat is transferred, the desiccant in the dehumidifying chamber is cooler and the desiccant in the regeneration chamber is hotter. This improves the moisture transfer ability of both the dehumidifying chamber and the regenerator and the humidity balance point is lowered. For less heat pumped from the dehumidifier side to the regenerator side, a higher humidity will result. In addition, the set-point will depend somewhat on the relative humidity of the air entering the regenerator.

Figure 4:
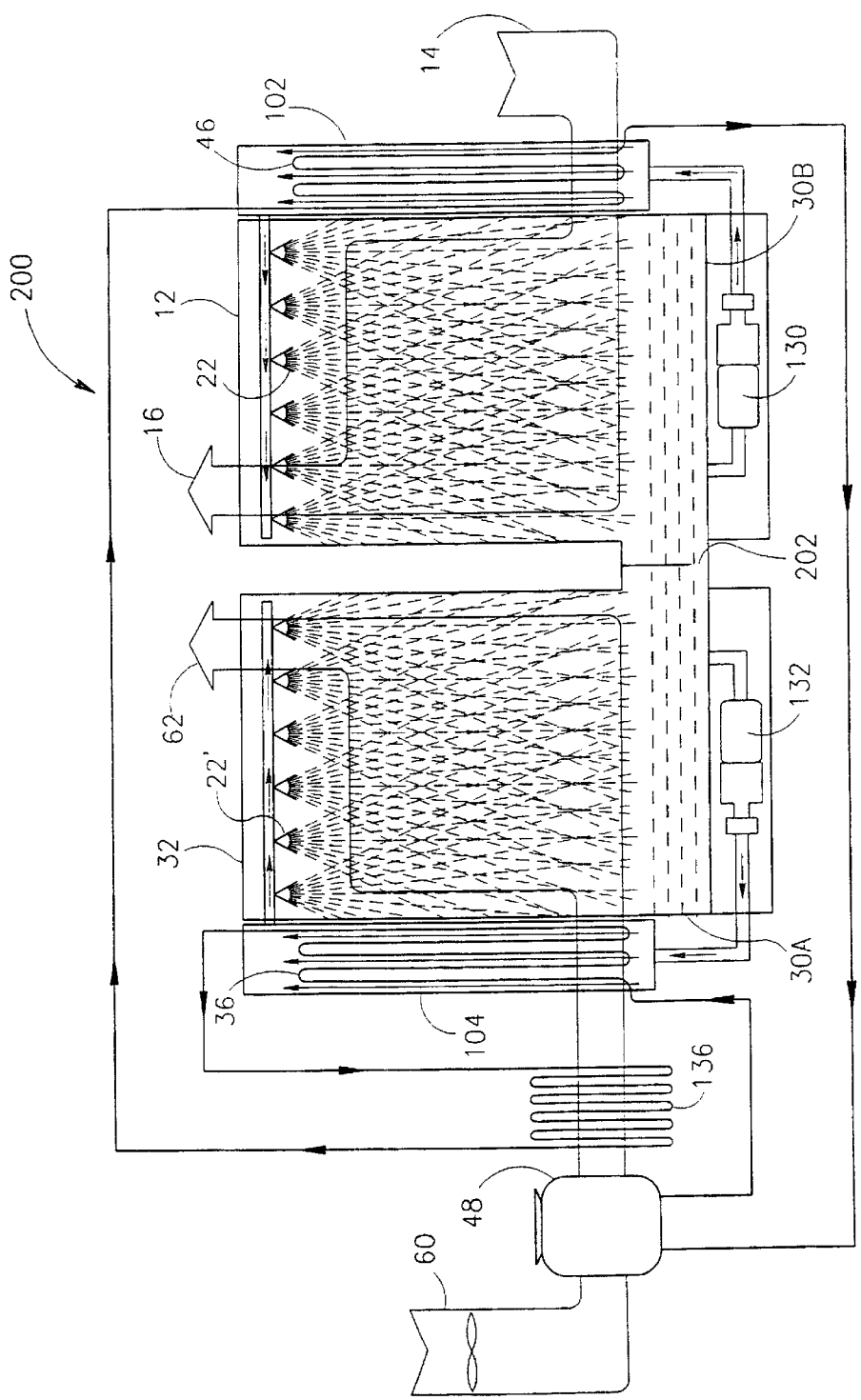
FIG. 4 schematically shows a dehumidifier unit system, in accordance with a preferred embodiment of the invention, that is also usable in a dehumidifying/air-conditioning systems in accordance with a preferred embodiment of the invention.

FIG. 4 shows another dehumidifier 200, in which no pumping of desiccant is required. Except as described below, it is generally similar to the dehumidifier of FIG. 3, except that there is no pumping of the desiccant liquid between the sumps 30A and 30B. (FIG. 4 does have a somewhat different layout from that of FIG. 3.) The inventors have surprisingly found that an appropriately shaped and sized aperture, such as aperture 202 connecting the two sumps provides a suitable way to provide required transfer between the two sumps.

In general, in a liquid desiccant system such as that of FIGS. 3 or 4, sump 30B (the sump of dehumidifying chamber 12) accumulates additional moisture over sump 30A (the sump of regenerator 32). This additional moisture must be transferred to sump 30A or directly to the regenerator in order to remove the moisture from the desiccant. In addition, the concentration of desiccant in sump 30B is much lower than that in sump 30A, and the proportion of desiccant in sump 30A must be continually increased so that the efficiency and drying capacity of regeneration is kept high.

One way of coping with this problem is to use a single sump, as in the device of FIG. 2. However, this results in substantially the same temperature for the desiccants used from dehumidification and that being regenerated. This results in a loss of efficiency.

In the dehumidifier of FIG. 3. the sumps are kept separate an pumps are used to pump the liquid from one sump to the other. This allows for a temperature differential to be maintained between the sumps and thus between the regenerator and the dehumidifying sections. As indicated above, pipe 30C is so constructed that only minimal liquid transfer takes place between the sumps. preserving a relatively high temperature differential.

However, the transfer of liquid in FIG. 3 is inefficient, since desiccant is inevitably transferred from the dehumidifying section to the regenerator and moisture is transferred to the dehumidifying section from the regenerator. In addition, in order to preserve the temperature differential, an undesirable balance of moisture and desiccants in the sumps is also preserved, even if it is reduced by the pumping. (The desiccant concentration is higher in the regenerator sump than in the sump of the dehumidifier section.) Both these effects result in reduced efficiency of both sections of the dehumidifier.

The apparatus of FIG. 4 solves this problem by transferring the desiccants and salts by diffusion between the liquids in the sumps, rather than by pumping desiccant solution between the sumps. Thus, on a net basis. only desiccant salt ions are transferred from the regenerator sump to the pumps, and only moisture, on a net basis is transferred from the dehumidifier sump to the regenerator sump.

In a preferred embodiment of the invention. aperture 202 is provided between sumps 30A and 30B. The size and positioning of this aperture is chosen to provide transfer of ions of water and desiccant salt between the sumps without an undesirable amount of thermal transfer, especially from the hotter to the cooler reservoir. In practice, the size of the aperture may be increased. such that at full dehumidification, the flow of heat between the sumps is at an acceptable level. When the hole is too large, there appears to be a flow of heat from the hotter regenerator reservoir to the cooler dehumidifier reservoir. Undesirable heat flow may be determined by measuring the temperature near the hole and comparing it to the temperature in the bulk solution in the sump. When the hole is too large, there will generally be a significant thermal flow from sump 30B to sump 30A. When the hole size is reduced too much, the transfer of ions is reduced and the overall efficiency is reduced.

It should be understood that the embodiment of FIG. 4 preferably provides temperature differentials of the same order (or even greater) than that of FIG. 3.

While the size is preferably empirically determined as described above, in an exemplary, but not limiting, experimental systems the aperture is rectangular, with rounded comers having a width of 1–3 cm (preferably about 2 cm) and a height of 1–10 cm, depending on the capacity of the system. Preferably, the hole is placed at the bottom of the partition between the reservoirs, so as to take advantage of the higher salt concentration in the regenerator reservoir at the bottom of the reservoir. The additional height allows the system to operate even under extreme conditions when some crystallization (which may block the aperture) occurs at the bottom of the reservoir.

It should be understood that the dimensions and positioning of the aperture or apertures is dependent on many factors and that the example given above was determined experimentally.

Some salient points about the dehumidifier of FIG. 4 should be noted. There is a net flow of moisture, via aperture 202 from reservoir 30B to reservoir 30A when the system has reached a steady state and the air conditions are constant. In fact, since the dehumidifier section is continuously adding moisture to the desiccant and the regenerator is continuously removing moisture from it, this is to be expected. During operation, the concentration of ions in reservoir 30A is generally higher than that in reservoir 30B. This will be true, because the desiccant in 30A is continuously being concentrated and that in 30B is continuously be diluted. This difference in concentration causes a diffusive flow of ions from reservoir 30A to reservoir 30B, via aperture 202. However, this is balanced by the flow of ions from reservoir 30B to 30A caused by the flow of solution in this direction. This results in no net flow of ions from one reservoir to the other. During periods of changing conditions of the input air, there may be a transient net flow of ions.

During a start-up transient, the total amount of liquid desiccant solution increases by the addition of moisture removed from the air. This means that during this transient period there is a net transfer of desiccant ions from reservoir 30B to 30A which results in the concentration of desiccant in reservoir 30B being lower than that in reservoir 30A during steady state.

In a practical system, during steady state, the temperature of the desiccant in reservoir 30B is 15° C. and the concentration is 25% by weight of salt. Preferably, the salt used is lithium chloride, since this is a stable salt with relatively high desiccating capacity. Lithium bromide is an even better desiccant, but is less stable; it too can be used. Other usable salts include magnesium chloride, calcium chloride and sodium chloride. Other liquid desiccants, as known in the art may also be used.

The temperature and concentrations for reservoir 30A is 400° C. and 35%. It should be understood that the concentration in reservoir 30A can be higher (without crystallization) than that in reservoir 30B due to the higher temperature of the desiccant. When the system stops, the concentrations and temperatures soon equalize. Of course, these numbers will vary widely depending on the temperature and humidity of the air being conditioned and the "set point" of the dehumidifier (as determined by the heat pump setting), among other factors.

In the preferred embodiment of the invention, there is no transfer of materials between the reservoirs, except via the aperture and no pumps are used for transfer.

Figure 5:
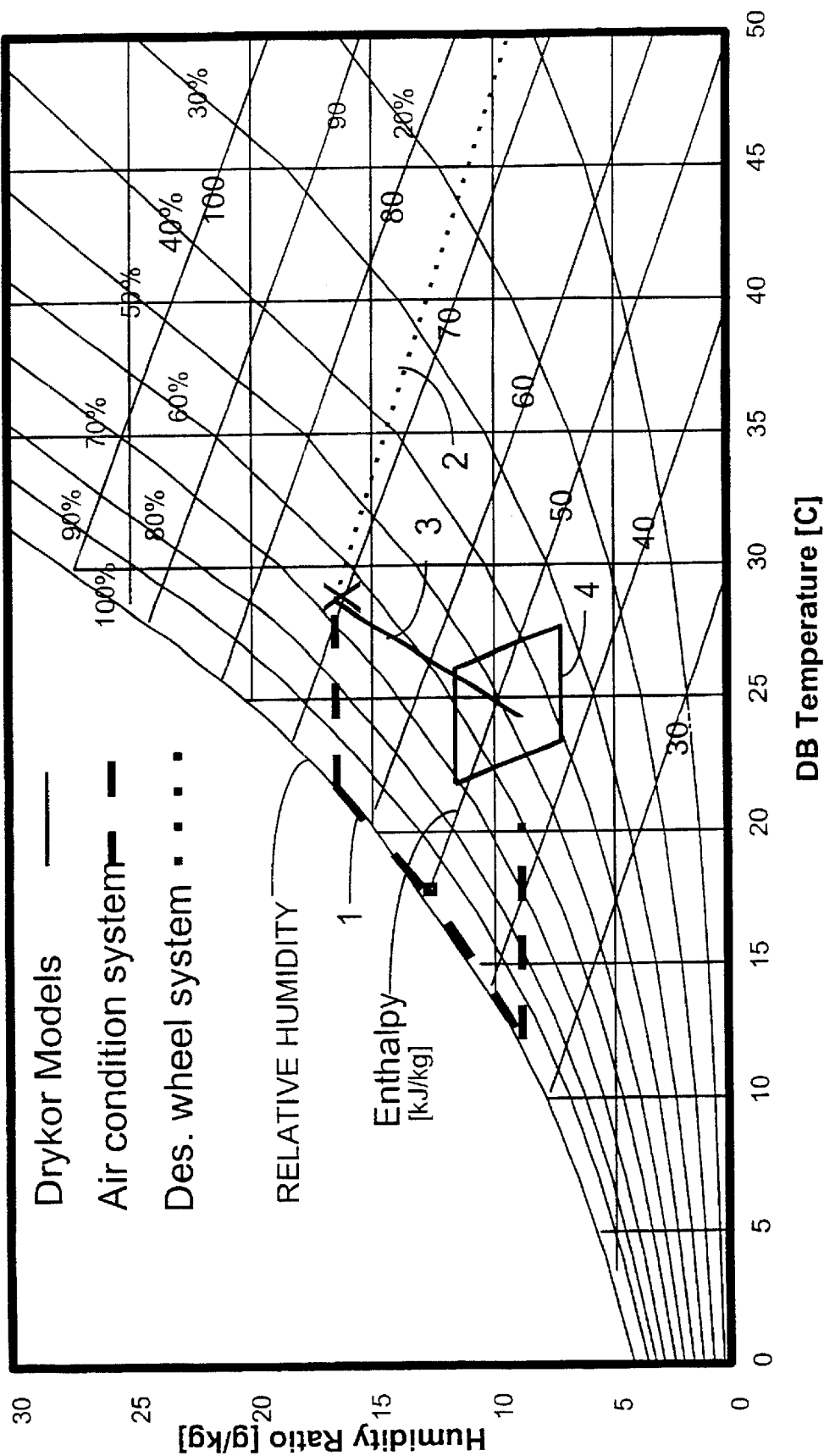
FIG. 5 shows the dehumidification curves for the systems described with respect to FIGS. 2–4, together with those for conventional air conditioning and dehumidification systems.

FIG. 5 shows a diagram, similar to that of FIG. 1, except that the desiccant systems of FIGS. 2–4 are represented by a line 3. This shows that the cooling of the desiccant in the dehumidifier side, by the heat pump, results in only a small change in the temperature of the air. This means that the air treated by the dehumidifier need neither be cooled by the air conditioner (as in the case of the desiccant systems of the prior art) nor need it be heated as is necessary if air conditioning systems are used to remove the moisture. This allows the air conditioning system to do the job they do best, namely removing heat from the air, while freeing them from any side effects of having a dehumidifier coupled to them, for example, the heating of the air into the air conditioner by the dehumidifier.

Figure 6:
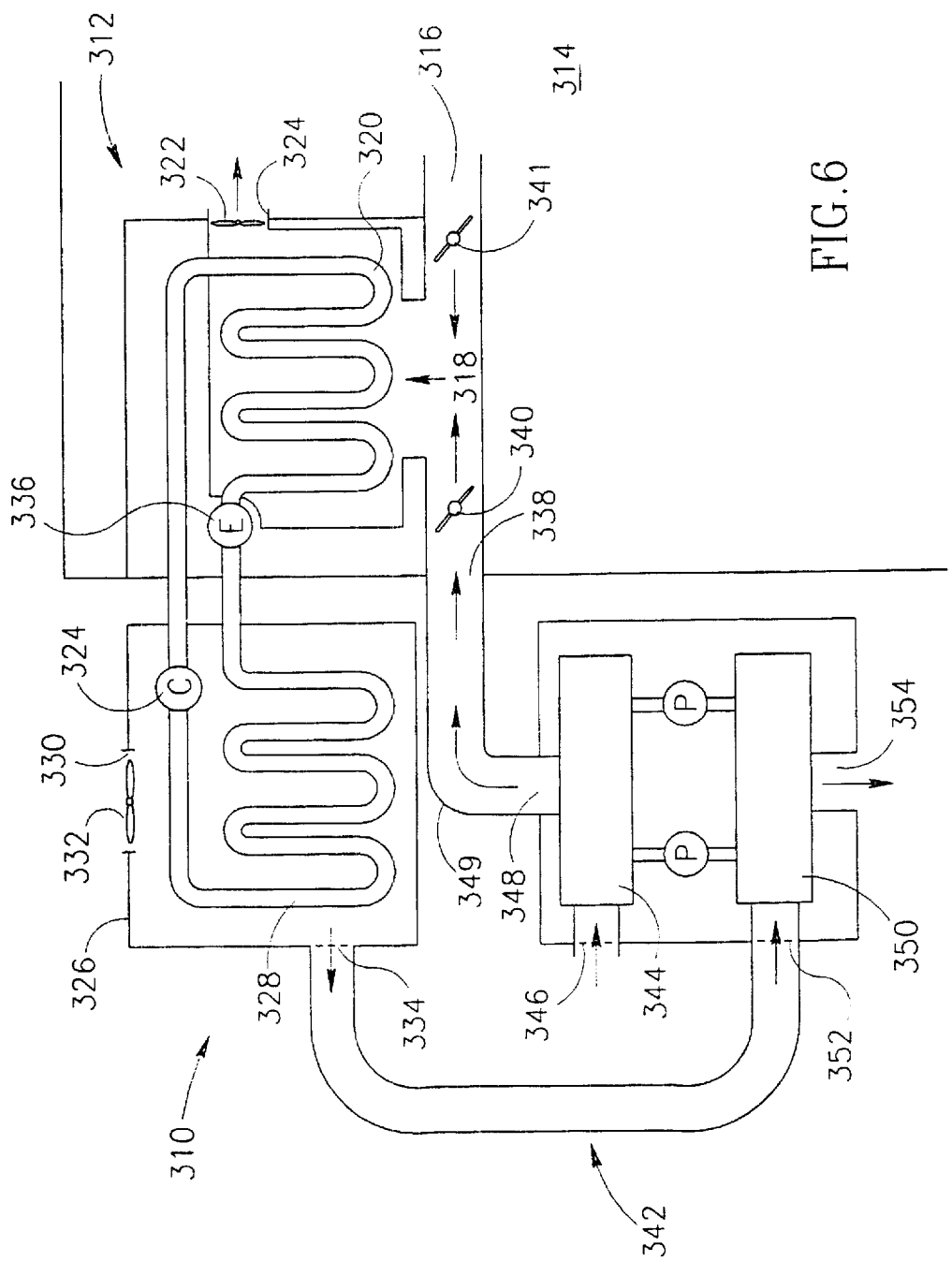
FIG. 6 is a schematic diagram of a combined dehumidifier/air-conditioner system in accordance with a preferred embodiment of the invention.

FIG. 6 is a block diagram of a combined dehumidifier/air-conditioner system 310 in the context of a split air conditioner 312, such as is normally used to cool an enclosed area such as a large room 314 in a house. Air conditioner 312, in its simplest form, comprises a room air inlet 316 which feeds room air via a conduit 318 to an evaporator 320 which cools the air. Air from the room is drawn into evaporator 320 by a fan 322 and exists the evaporator via a room air outlet 324 to room 314.

Heated refrigerant is compressed by a compressor 324 (shown in an outside portion of air conditioner 312) and passed to a condenser 328. Condenser 328 is cooled by outside air drawn into a cooling inlet 330 by a fan 332. Heated air exits outside portion 326 via a waste heat outlet 334.

The cooled compressed refrigerant is expanded in an expander 336 and returns to evaporator 320 to be used to cool the room air.

Additionally, air conditioner 312 comprises a fresh air inlet 338 through which fresh air is brought in to the room. The quantity of fresh air is generally controlled by a louver or baffle system 340, 341. Either one or both louvers or baffles 340, 341 may be supplied, depending on the amount and type of control over the proportion of fresh air required. The fresh air is mixed with the air drawn from the room and is fed to evaporator 320.

Air conditioner 312. as described, is completely conventional in design. In some preferred embodiments of the invention, other types of air conditioning systems may be used as appropriate.

In preferred embodiments of the invention, a dehumidifier unit 342 is utilized to increase the efficiency and cooling capacity of the air-conditioner.

Dehumidifier 342. in a simplified block diagram comprises a drying unit 344 which receives outside air via a wet air inlet 346 and passes dried air out of a dried air outlet 348. The air is dried in unit 344 by passing it through a mist, or the like, of liquid desiccant or desiccant solution. Moisture in the air is adsorbed by the desiccant. In a preferred embodiment of the invention, dried air outlet 348 communicates with fresh air inlet 338 of air conditioner 312, preferably, via a conduit 349. Preferably, since the impedance of drying unit is relatively low, no air pump, additional to fan 322 of the air conditioner is required. However, one may be provided, in some embodiments of the invention.

Desiccant with adsorbed water is transferred to a regenerator 350 in which the desiccant is regenerated by removing moisture from it, by heating the desiccant. In a preferred embodiment of the invention, this heating (and the carrying away of the water vapor removed from the desiccant) is accomplished by passing hot air through the desiccant (preferably the desiccant is in a mist or other finely divided form). The hot relatively dry air enters the dehumidifier via an inlet 352 and exits via an outlet 354. This hot air is conveniently and efficiently provided, in accordance with a preferred embodiment of the invention, by connecting waste heat outlet 334 of air conditioner 312 with inlet 352 of the dehumidifier. Since the pressure drop in regenerator 350 is very low, in preferred embodiments of the invention, no fan or other air pump in addition to fan 332 of air conditioner 312 is needed to move the air through the regenerator.

While, in a preferred embodiment of the invention, no additional fans are required for moving air into or out of the dehumidifier, such fan or fans could be present, if convenient, as for example if stand alone dehumidifier and air conditioners are to be integrated as described herein.

In a preferred embodiment of the invention, the air conditioner and dehumidifier share a common control panel from which both are controlled and from which, preferably, all the above functions can be turned on or off or adjusted.

In preferred embodiments of the invention, one of the systems of FIGS. 1–3 is used as dehumidifier 342. In these embodiments of the invention, port 348 of FIG. 4 corresponds to port 16 of FIGS. 1–3, port 352 corresponds to port 60, port 346 corresponds to port 14 and port 354 corresponds to port 62. It should be further understood that dehumidifier 342 is shown in very schematic form in FIG. 4 and that, for example, the placement of the elements may be different and many elements are not shown in FIG. 4. In addition, for the embodiment of FIG. 3 the pumps shown in FIG. 4 are not present. Furthermore, the heat-pumps of FIGS. 1–3 are not shown in FIG. 4, although they are preferably present in the system.

System 310 has a number of advantages over the prior art. As can be easily noted from FIG. 4, dehumidifier 342 can be an add on to air conditioner 312, which may be a standard unit. The task of drying incoming air, performed in a most inefficient manner by the air conditioner, has been transferred to a more efficient dehumidifier which utilizes waste heat from the air conditioner for most of its energy (only energy to pump the desiccant between dryer 344 and regenerator 350 is needed). The capacity of the air conditioner system for cooling is enhanced since it no longer needs to dry the air. The efficiency of the combined unit actually increases with increasing temperature in contrast to normal air conditioner systems. While the heat available is the heat developed by the air conditioner in cooling all of the air, the dehumidifier dries only part of the air, namely that entering the room. This balance means that the heating requirements for the dehumidifier are generally easily met by the air conditioner exhaust.

In addition, while air conditioning systems are not suitable for use in high humidity, low temperature situations, the system of the present invention is effective in these situations as well.

A combination device such as that described above, has shown a 60% cooling capacity over the air conditioner itself and a 30% efficiency improvement over the use of an air conditioner by itself, for the same indoor air quality.

The invention has been described in the context of particular non-limiting embodiments. However, other combinations of air conditioning and dehumidifiers in accordance with the invention, as defined by the claims will occur to persons of skill in the art. For example, in FIG. 2, the heat is removed from liquid desiccant in the sump. Alternatively, it could be removed from liquid desiccant being transported to the drying chamber. In FIGS. 3 and 4 the heat is pumped from liquid desiccant while it is being transported to the drying chamber. Alternatively, it could be removed from the liquid desiccant in a sump that receives carrier liquid from the drying chamber. FIG. 2 shows a different type of regenerator than does FIGS. 3 and 4. In some preferred embodiments of the invention, the regenerator types are interchangeable. FIG. 2 shows the heat being transferred by the heat pump to the liquid in the regeneration chamber. Alternatively, or additionally, it can be transferred to liquid desiccant being transported to the regeneration chamber (as in FIGS. 3 and 4). Finally, while not shown in the FIGS., the heat could be transferred to liquid in sump 30A for all both FIGS. 3 and 4. Additionally, while many features are shown in the preferred embodiments, some of these features, although desirable, are not essential.

As used in the claims the terms "comprise","include" or "have" or their conjugates mean "including but not limited to".

What is claimed is:

1. A dehumidifier system comprising:
    a liquid desiccant in two reservoirs, one of which contains a higher desiccant concentration than the other;
    a dehumidifier unit into which moist air is introduced and from which less moist air is removed after dehumidification by liquid desiccant transferred thereto;
    a regenerator unit which receives desiccant solution that has absorbed from the moist air and removes moisture from it; and
    a passageway connecting the reservoirs, via which passageway, during steady state operation of the dehumidifier, there is a net flow of moisture from the reservoir having the lower desiccant concentration to the other reservoir without there being a net flow of desiccant ions through the passageway.

2. A dehumidifier system according to claim 1 wherein there is no pumping of liquid from one reservoir to the other.

3. A dehumidifier system according to claim 1 wherein there is no pumping of liquid between the dehumidifier unit and the regenerator unit.

4. A dehumidifier unlit according to claim 1 wherein there is no transfer of liquid between the dehumidifier unit and the regenerator unit except via apertures connecting the reservoirs.

5. A dehumidifier system comprising:
    a liquid desiccant in two reservoirs, one of which contains a higher desiccant concentration than the other, during operation;
    a dehumidifier unit into which moist air is introduced and from which less moist air is removed after dehumidification by liquid desiccant transferred thereto;
    a regenerator unit which receives desiccant solution that has absorbed from the moist air and removes moisture from it; and
    a passageway connecting the reservoirs, via which passageway, during steady state operation of the dehumidifier, there is a net flow of moisture from the reservoir having the lower desiccant concentration to the other reservoir,
    wherein there is no pumping of liquid desiccant between the dehumidifier unit and the regenerator unit in either direction.

6. A dehumidifier unit according to claim 5 wherein there is no transfer of liquid between the dehumidifier unit and the regenerator unit in either direction except via apertures connecting the reservoirs.

7. A dehumidifier system according to any of claims 1 or 2–6 wherein the passageway is at least one aperture in a partition between the two reservoirs.

8. A dehumidifier system comprising:
    a liquid desiccant in two reservoirs, one of which contains a higher desiccant concentration than the other, during operation;
    a dehumidifier unit into which moist air is introduced and from which less moist air is removed after dehumidification by liquid desiccant transferred thereto;
    a regenerator unit which receives desiccant solution that has absorbed from the moist air and removes moisture from it; and
    at least one aperture formed in a partition between the reservoirs, said at least one aperture connecting the reservoirs, via which at least one aperture, during steady state operation of the dehumidifier, there is a net flow of moisture from the reservoir having the lower desiccant concentration to the other reservoir,
    wherein there is no transfer of liquid in either direction between the dehumidifier unit and the regenerator unit except via the at least one aperture.

9. A dehumidifier system according to any of claims 1 or 2–6 wherein said transfer of moisture is by gravity.

10. A dehumidifier system according to any of claims 1 or 2–6 wherein the two reservoirs include a first reservoir which receives said liquid desiccant from said dehumidifying chamber after said desiccant absorbs moisture thereat, wherein liquid desiccant is transferred to the dehumidifying chamber from the first reservoir.

11. A dehumidifier system according to any of claims 1 or 2–6 wherein the two reservoirs include a second reservoir which receives said liquid desiccant from said regenerator after removal of moisture therefrom, wherein liquid desiccant is transferred to the regenerating chamber from said second reservoir.

12. A dehumidifier system according to any of claims 1 or 2–6 and including a beat pump that transfers heat from relatively cooler liquid desiccant to relatively warmer liquid desiccant.

13. A dehumidifier system according to claim 12 wherein the heat pump pumps heat from the reservoir having the lower concentration of desiccant to that having the higher concentration of desiccant.

14. A dehumidifier system according to any of claims 1 or 2–6 wherein a temperature differential of at least 5° C. is maintained between the first and second reservoirs.

15. A dehumidifier system according to claim 14 wherein the temperature differential is at least 10° C.

16. A dehumidifier system according to claim 14 wherein the temperature differential is at least 15° C.

* * * * *